United States Patent
Morino et al.

(10) Patent No.: US 7,370,518 B2
(45) Date of Patent: May 13, 2008

(54) HEATING RESISTOR TYPE FLUID FLOW RATE MEASURING APPARATUS AND CONTROL APPARATUS FOR INTERNAL COMBUSTION ENGINE HAVING THE MEASURING APPARATUS

(75) Inventors: Takeshi Morino, Hitachinaka (JP); Chihiro Kobayashi, Naka (JP); Shinya Igarashi, Naka (JP); Kiichi Otaka, Hitachinaka (JP); Yasuji Nishi, Toyota (JP); Yasunobu Kojima, Nisshin (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 10/562,824

(22) PCT Filed: Sep. 22, 2004

(86) PCT No.: PCT/JP2004/013810

§ 371 (c)(1),
(2), (4) Date: Jun. 6, 2006

(87) PCT Pub. No.: WO2005/028840

PCT Pub. Date: Mar. 31, 2005

(65) Prior Publication Data

US 2006/0277983 A1    Dec. 14, 2006

(30) Foreign Application Priority Data

Sep. 24, 2003 (JP) .............................. 2003-331552

(51) Int. Cl.
*G01M 15/00* (2006.01)
(52) U.S. Cl. .................... 73/118.2; 73/204.11
(58) Field of Classification Search .................. 73/116, 73/117.2, 117.3, 118.1, 118.2, 202.5, 204.11
See application file for complete search history.

(56) References Cited

U.S. PATENT DOCUMENTS

| | | | | |
|---|---|---|---|---|
| 6,756,571 B2 * | 6/2004 | Saikalis et al. | ............. | 219/497 |
| 6,810,859 B2 * | 11/2004 | Akagi et al. | ................. | 123/488 |
| 6,860,149 B2 * | 3/2005 | Igarashi et al. | .......... | 73/204.15 |
| 2006/0162441 A1 * | 7/2006 | Ando | ...................... | 73/204.15 |

FOREIGN PATENT DOCUMENTS

| | | |
|---|---|---|
| JP | 61-97528 | 5/1986 |
| JP | 63-41644 | 2/1988 |
| JP | 5-79877 | 3/1993 |
| JP | 8-277768 | 10/1996 |

* cited by examiner

*Primary Examiner*—Eric S. McCall
(74) *Attorney, Agent, or Firm*—Mattingly, Stanger, Malur & Brundidge, PC (57) ABSTRACT

To realize a control apparatus for an internal combustion engine having a heating resistor type air flow rate measuring apparatus which can effectively remove salinity adhered to the heating resistor. Salt adheres not only to the heating portion of a heating resistor but also to lead members and supporting members. When a certain time period is passed after the current supply to the heating resistor is stopped, the salt adhered thereto absorbs moisture in the air by deliquescence, and becomes salt water near the heating resistor and the support members etc. Then, suction air flows through an auxiliary air passage by the cranking of the engine to disperse the salt water adhered not only to the support member parts but also to the heating resistor. Thus, even if the heating resistor is supplied with current after the dissipation, salt components do not remain on the heating resistor.

11 Claims, 6 Drawing Sheets

FIG. 2A
IMMEDIATELY AFTER SUCKING SALT WATER

FIG. 2B
CHANGE SALT INTO SALT WATER BY DELIQUESCENCE

FIG. 2C
IMMEDIATELY AFTER AIR SUCTION BY CRANKING ETC.

FIG. 2D
CURRENT SUPPLY TO HEATING RESISTOR

FIG. 3

FIG. 4A
IMMEDIATELY AFTER SUCKING SALT WATER

FIG. 4B
CHANGE SALT INTO SALT WATER BY DELIQUESCENCE

FIG. 4C
CURRENT SUPPLY TO HEATING RESISTOR

FIG. 4D
IMMEDIATELY AFTER AIR SUCTION BY CRANKING ETC.

HEATING RESISTOR TYPE FLUID FLOW RATE MEASURING APPARATUS AND CONTROL APPARATUS FOR INTERNAL COMBUSTION ENGINE HAVING THE MEASURING APPARATUS

TECHNICAL FIELD

The present invention relates to a heating resistor type fluid flow rate measuring apparatus utilizing a heating resistor for measuring a flow rate of fluid such as air and relates to the control apparatus for an internal combustion engine having the measuring apparatus.

BACKGROUND ART

As a technique for measuring a flow rate of gas, in general, there is known a heating resistor type air flow rate measuring apparatus for measuring a flow rate of air. This measuring apparatus utilizes the relation that an amount of heat absorbed from the heating resistor increases monotonously in accordance with the increase of an flow rate of air. Since this measuring apparatus can directly measure a mass air flow rate, this measuring apparatus is used widely as a flow meter for measuring an air flow rate for the internal combustion engine of an automobile.

An air cleaner is provided at the upstream portion of the suction pipe of the internal combustion engine, whereby air from which dust within the atmosphere is removed is supplied within the engine.

However, since the dust collecting ability of the air cleaner is not complete, fine dust component etc. passes the air cleaner and is sucked into the engine via the suction pipe.

Since the heating resistor type air flow rate measuring apparatus is provided in a manner that the heating resistor serving as a flow rate measuring portion is exposed within the suction pipe, the heating resistor deteriorates with age due to the adhesion of dust etc. thereto as described above.

Thus, there is known a technique as described in a patent document 1(JP-A-63-41644) that a heating resistor is heated at about 100° C. after stopping an engine thereby to burn dust component etc. adhered to the heating resistor.

DISCLOSURE OF THE INVENTION

In the aforesaid conventional technique, when water drops etc. as well as dust scatters, it is required to prevent that water adheres to the heating resistor and so an amount of heat dissipation from the heating resistor changes. Thus, it is necessary to take such a method that the heating temperature of the heating resistor is set to a value at which dust and water hardly adheres. This temperature is 150° C. or more in general.

When the heating temperature is set to 100° C. or more, the water adhered to the heating resistor evaporates instantaneously and does not remain on the heating resistor at all. However, when impurities etc. is mixed within water, the impurities remains on the surface of the heating resistor after the evaporation of the water, which causes the deterioration of the resistor.

There is salinity as an example of the impurities. As the most remarkable example of the salinity adhesion, there is a case that salinity adheres due to snow melting material which is used to melt snow in cold districts. The snow melting material is almost composed by salinity and acts to melt snow when being sprinkled on a road.

The snow melting material and snow having been melted remains on a road as salt water. The salt water is whirled up within the atmosphere by tires etc. of vehicles running on a road and the atmosphere is sucked into engines of succeeding vehicles.

Although the salt water is caught by an air cleaner filter, since the salt water is liquid, the salt water is absorbed into the filter. Thus, when an amount of the salt water exceeds the allowable value of the filter, the salt water is discharged into a suction pipe. When the salt water thus discharged adheres to the heating resistor, although the liquid evaporates, the salinity does not evaporate and is kept to be adhered to the surface of the heating resistor.

As a result, an amount of heat dissipation of the heating resistor changes between before and after the adhesion of salt, and the change of the amount of heat dissipation causes the deterioration of the characteristics of the heating resistor type air flow rate measuring apparatus.

Further, salinity has deliquescent property that it absorbs moisture in the atmosphere and melts. Thus, when the current supply to the heating resistor is stopped, the salt absorbs moistures of air contained in the peripheral atmosphere and so melts, whereby the salinity remains on the surface of the heating resistor due to the surface tension.

When an ignition key of the engine is turned on to supply current to the heating resistor in this state, salt water evaporates immediately and salinity remains on the surface of the heating resistor. This is such a state that a person drives a vehicle on a road on which the snow melting material is sprinkled and gets home, then the person stops the engine of the vehicle and parks the vehicle in a garage during the night, and the person starts the engine and goes out by the vehicle tomorrow. Such a state is experienced daily. Further, when such a phenomenon is repeatedly performed, an adhered amount of salt becomes much and further the salt adheres more rigidly.

An object of the present invention is to realize a heating resistor type air flow rate measuring apparatus which can effectively remove salinity adhered to the heating resistor and a control apparatus for an internal combustion engine having the measuring apparatus.

In order to solve the aforesaid problems, the present invention is configured in the following manner.

(1) The control apparatus for an internal combustion engine includes a heating resistor type air flow rate measuring apparatus and controls an amount of air etc. sucked into the engine based on an air flow rate measured by the air flow rate measuring apparatus.

The control apparatus for an internal combustion engine starts the heating of the heating resistor upon the lapse of a constant time period after instructing the start of rotation to the engine. Thus, the air flow is supplied to the heating resistor before heating of the heating resistor thereby to remove attached material to the heating resistor.

(2) In the control apparatus for an internal combustion engine of (1), the heating current is supplied to the heating resistor upon lapse of the constant time period after the supply of the operation current for the engine.

Accordingly, the heating of the heating resistor can be delayed by the constant time period.

(3) The heating resistor type fluid flow rate measuring apparatus flows a current to the heating resistor to heat the resistor in accordance with an instruction signal supplied from the outside thereby to measure a fluid flow rate.

A heat generation delay means for the heating resistor starts to heat the heating resistor upon lapse of a constant time period after the instruction signal is supplied from the outside.

Accordingly, the air flow is supplied to the heating resistor before heating of the heating resistor thereby to remove attached material to the heating resistor.

(4) The heat generation delay means supplies the heating current for the heating resistor upon lapse of the constant time period after the instruction signal is supplied from the outside, there by delaying the heating of the heating resistor by the constant time period.

Since salt has deliquescence property, salt melts and changes into salt water upon the lapse of a certain time period when a current is not supplied to the heating resistor. That is, if fluid is flown when the salt is in a salt water state thereby to disperse the salt water, no material (salt components) adheres to the heating resistor even if a current is supplied to the heating resistor thereafter.

Further, since a large amount of air flows instantaneously at the time of the cranking of the engine, it becomes possible to disperse salt water adhered to the heating resistor. Furthermore, since the engine vibrates largely at the time of the cranking, salt water more likely disperses due to the vibration. A current is supplied to the heating resistor upon lapse of the constant time period after salt water is dispersed, so that there remains no salt components on the heating resistor.

According to the present invention, it is possible to realize the heating resistor type fluid flow rate measuring apparatus which can effectively remove salinity adhered to the heating resistor and the control apparatus for an internal combustion engine having the measuring apparatus.

BEST MODE FOR CARRYING OUT THE INVENTION

An embodiment of the present invention will be explained with reference to accompanying drawings. The embodiment explained below relates to the case where the present invention is applied to a heating resistor type air flow rate measuring apparatus.

Figure 5:
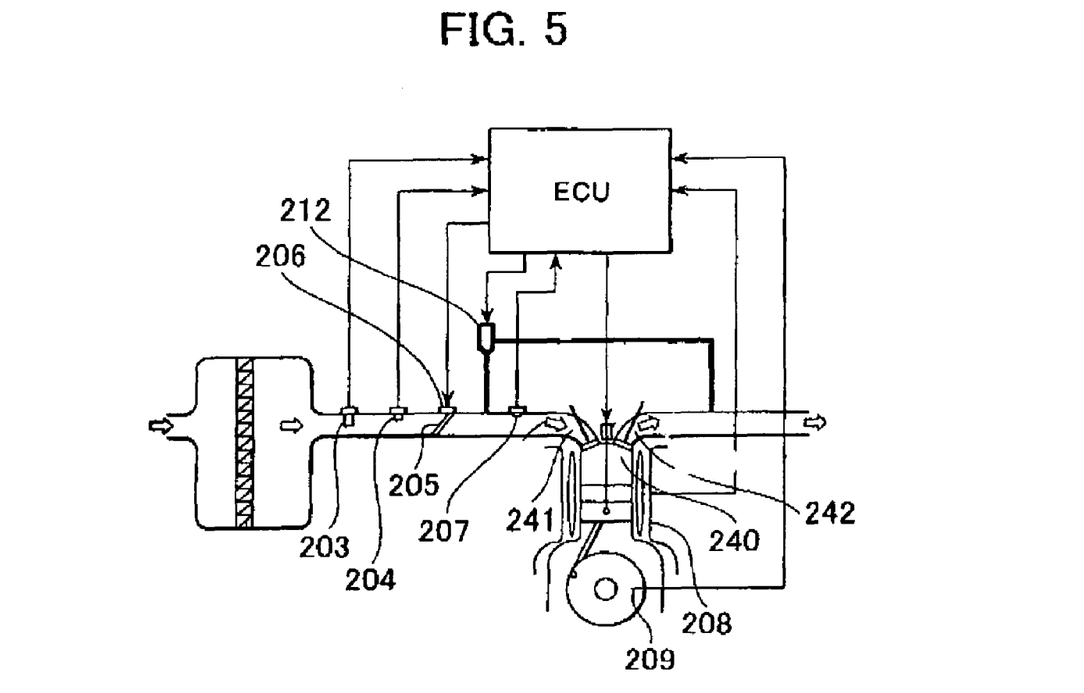
FIG. 5 is a schematic diagram showing the configuration of a system for performing the EGR control for a diesel engine to which the present invention is applied.

FIG. 5 is a schematic diagram showing the configuration of a system for controlling the EGR (exhaust gas recirculation) apparatus for a diesel engine to which the present invention is applied. This system shows an example of an electronic control type exhaust gas recirculation system.

In FIG. 5, an exhaust gas recirculation pipe is disposed so as to communicate a suction air passage 241 and an exhaust gas passage 242 via an engine cylinder 240 sandwiched therebetween, and an EGR valve 212 is disposed between the suction air passage and the exhaust gas passage.

The opening degree of the EGR valve 212 is determined in accordance with an instruction signal from an engine control unit (ECU). The engine control unit (ECU) determines this instruction signal basically based on an engine speed signal obtained from an engine rotation speed detection means 209, a valve opening degree signal obtained from the valve opening degree detection means 206 of a negative pressure generation valve 205 provided within the suction air passage, a cooling water temperature signal obtained from an engine cooling water temperature detection means 208, a suction air temperature signal obtained from a suction air temperature detection means 204, a pressure signal obtained from a suction air passage pressure detection means 207, and an accelerator pedal opening degree signal representing a load amount of a fuel injection amount from a driver, and so on.

Further, since a suction air amount is measured based on a new suction air flow rate signal obtained from a heating resistor type air flow rate measuring apparatus 203 for measuring a new suction air flow rate, the EGR control with a high accuracy is made possible and so the generation of NOx and black smoke can be further suppressed.

Thus, when salinity etc. adheres to the heating resistor of the heating resistor type air flow rate measuring apparatus 203, the measurement accuracy of an air flow rate degrades and so it becomes difficult to perform the EGR control with a high accuracy.

Next, the explanation will be made as to the operation theory of the heating resistor type air flow rate measuring apparatus.

Figure 6:
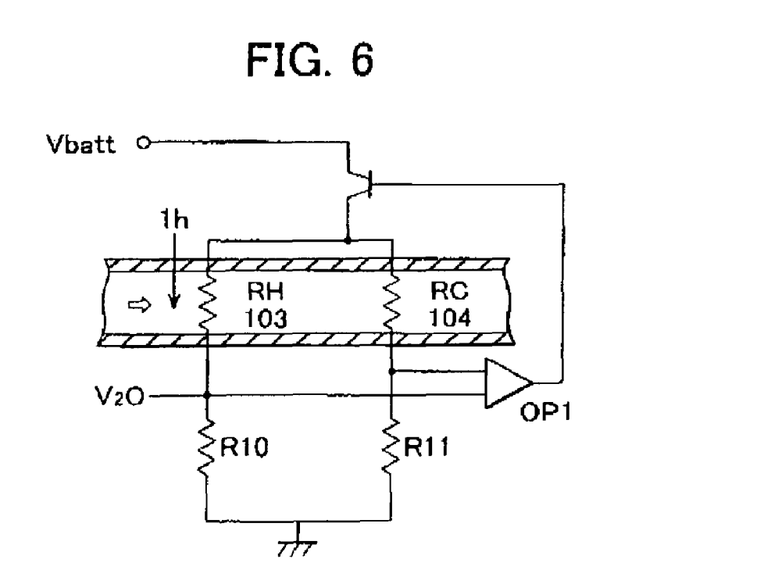
FIG. 6 is a circuit diagram showing the schematic configuration of the heating resistor type air flow rate measuring apparatus.

FIG. 6 is a circuit diagram showing the schematic configuration of the heating resistor type air flow rate measuring apparatus. The driving circuit of the heating resistor type air flow rate measuring apparatus includes a bridge circuit and a feedback circuit. The bridge circuit is configured by a heating resistor (RH) 103 for measuring an air flow rate of the suction air, a thermo-sensitive resistor (RC) 104 for compensating the temperature of suction air and resistors R10, R11.

The control is performed in a manner that a heating current Ih is flowed into the heating resistor 103 while performing the feedback control using an operational amplifier OP1 so that a constant temperature difference is kept between the heating resistor 103 and the thermo-sensitive resistor 104.

The heating temperature of the heating resistor 103 is controlled so as to be a value almost equal to the sum of the suction air temperature and 150° C. The temperature difference is kept constant regardless of a heat amount dissipated in the air.

That is, when the flow rate is large, since an amount of the heat absorbed from the heating resistor 103 is large, an amount of the heating current Ih is made large. In contrast, when the flow rate is small, an amount of the heating current Ih is made smaller as compared with the case where the flow rate is large. This is because, in the latter case, since an amount of the heat absorbed from the heating resistor 103 is small, an amount of the heating current can be made small.

Since a voltage signal V2 obtained from the heating current Ih changes in accordance with the air flow rate, the flow rate of the air flowing through the suction air passage can be measured by measuring the voltage signal V2.

Figure 7:
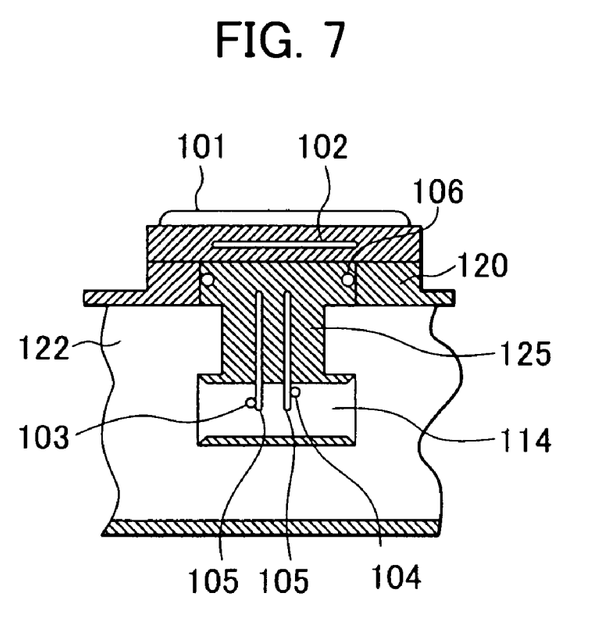
FIG. 7 is a transversal sectional diagram showing an example of the heating resistor type air flow rate measuring apparatus.
Figure 8:
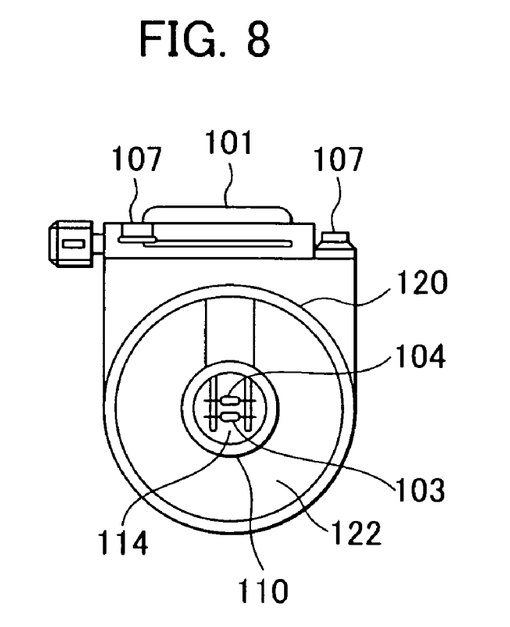
FIG. 8 is an external view of the air flow rate measuring apparatus shown in FIG. 7, which is seen from the upstream (left) side.

FIG. 7 is a transversal sectional diagram showing an example of the heating resistor type air flow rate measuring apparatus. FIG. 8 is an external view of the air flow rate measuring apparatus shown in FIG. 7, which is seen from the upstream (left) side.

In FIGS. 7 and 8, the heating resistor type air flow rate measuring apparatus includes a circuit board 102 constituting the driving circuit, a housing member 101 containing the circuit board 102 therein, and an auxiliary air passage constituting member 110 formed by non-conductive member, and so on.

Within an auxiliary air passage 114 formed by the auxiliary air passage constituting member 110, the heating resistor 103 for detecting the air flow rate and the thermo-sensitive resistor 104 for compensating the temperature of suction air electrically coupled to the circuit board 102 via a supporting member 105 made of conductive member.

The housing member 101, the circuit board 102, the passage 110, the heating resistor 103 and the thermo-sensitive resistor 104 etc. are integrally configured as a module of the heating resistor type air flow rate measuring apparatus.

An auxiliary air passage insertion hole 125 is formed at the wall surface of a main air passage constituting member 120 constituting a suction air passage (main passage) 122. The auxiliary air passage 114 portion of the heating resistor type air flow rate measuring apparatus is inserted from the outside of the suction air passage 122 via the auxiliary air passage insertion hole 125.

Then, the wall surface of the main air passage constituting member 120 and the housing member 101 are fixed to each other by means of screws 107 etc. so as to maintain the mechanical strength. Further, a seal member 106 is attached between the auxiliary air passage constituting member 110 and the constituting member 120 of the suction air passage 122, thereby maintaining the airtightness between the inside and the outside of the suction air passage.

Figure 9:
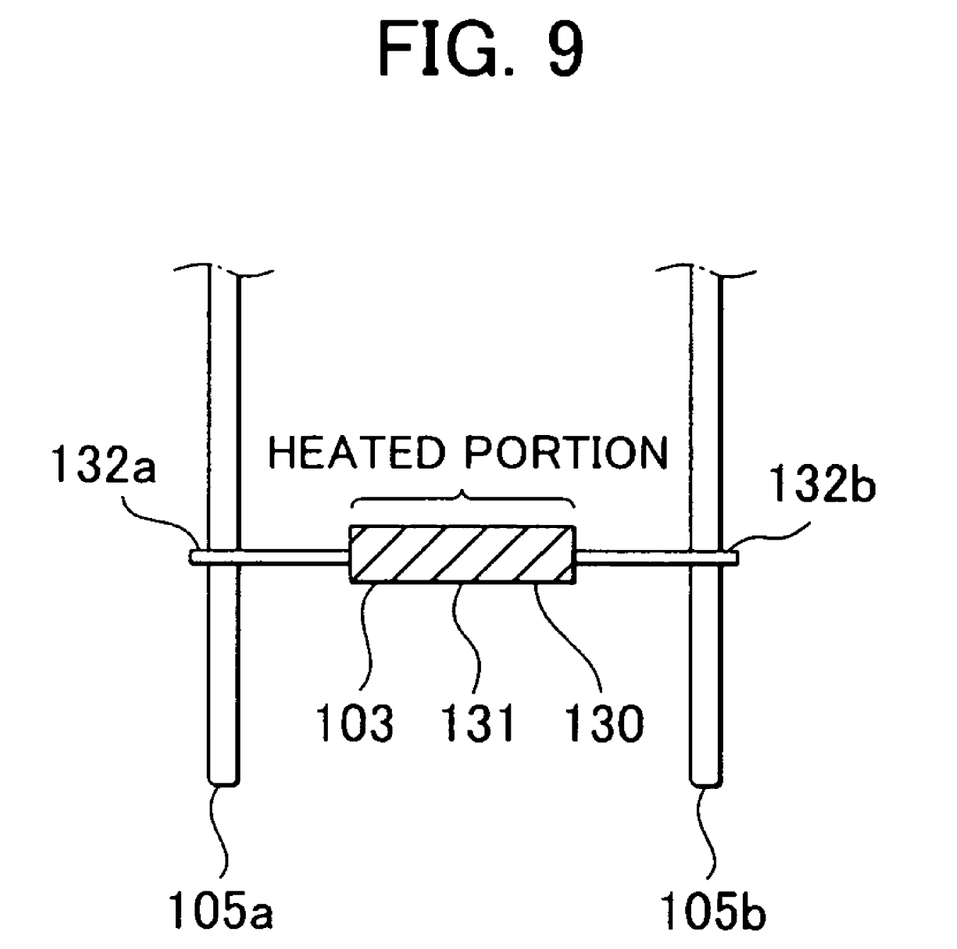
FIG. 9 is an external view showing the schematic configuration of the heating resistor.

FIG. 9 is an external view showing the schematic configuration of the heating resistor 103.

In FIG. 9, the heating resistor 103 for detecting the air flow rate is arranged in a manner that a resistor 131 formed by platinum material etc. is wound around a cylindrical bobbin 130 formed by insulating material. Further, the both ends of the heating resistor 103 are electrically coupled to lead members 132a,132b by means of the welding etc., respectively. The lead members 132a,132b are electrically coupled to supporting members 105a,105b by means of the welding etc., respectively.

Here, the heating resistor is configured in a manner that the portion where heat is generated mainly at the time of measuring the flow rate is a portion where the resistor 131 is wound, and the most area of each of the lead members 132 and the supporting members 105a,105b does not generate heat.

The adhering phenomenon of the salinity is apt to appear remarkably at the portion of the heating resistor 103 where heat is generated.

The explanation will be made as to the operation from the turning-on of an ignition key to the start of the engine in the control apparatus for the engine having the heating resistor type air flow rate measuring apparatus.

Figure 1:
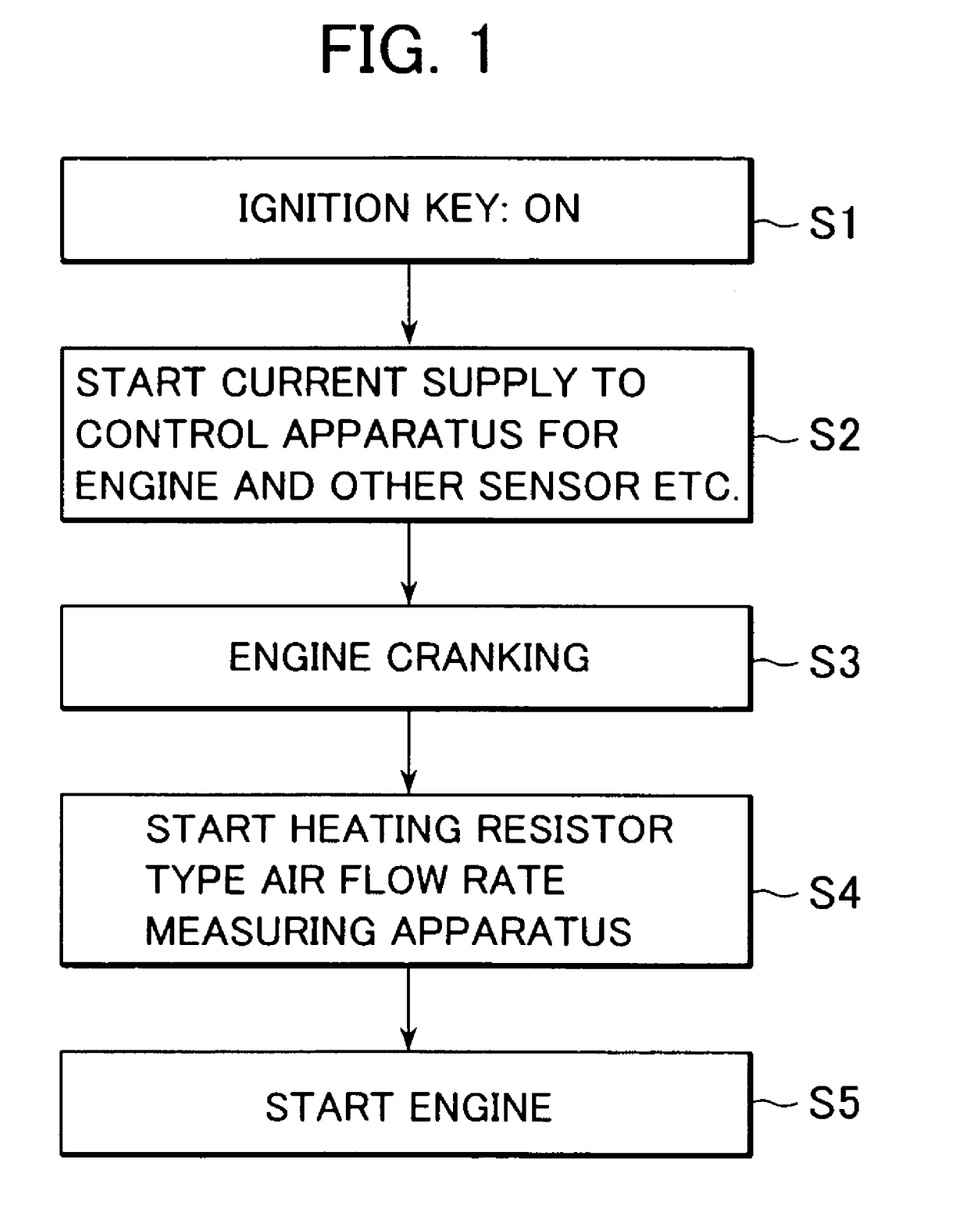
FIG. 1 is a flowchart of the control operation of a control apparatus for an internal combustion engine according to an embodiment of the present invention.

FIG. 1 is a flowchart of the control operation of the control apparatus for the engine according to the embodiment of the present invention.

After the ignition key is turned on in step S1 of FIG. 1, the operation current is started to be supplied to the engine in step S2, and also the current is supplied simultaneously to a sensor etc. other than the heating resistor type air flow rate measuring apparatus.

After step S2, the cranking of the engine is started to start the engine in step S3.

Next, in step S4, upon the lapse of a constant time period, for example, one second after the start of the engine cranking, the current is started to be supplied to the heating resistor type air flow rate measuring apparatus. The engine cranking may be executed at the time point where an instruction or a signal for the cranking is generated. Alternatively, the engine cranking may be executed at the time point where an engine rotation speed detection means 209 etc. detects the actual rotation of the engine.

Then, the engine is started at step S5.

As described above, according to the embodiment of the present invention, although the current is started to be supplied to the engine after the turning-on of the ignition key, the current is supplied to the sensor etc. other than the heating resistor of the air flow rate measuring apparatus. Thereafter, the current is started to be supplied to the heating resistor type air flow rate measuring apparatus after the engine cranking is executed, thereby starting the engine.

That is, the present invention is characterized in that the current is supplied to the heating resistor of the air flow rate measuring apparatus after the cranking is executed thereby to flow suction air within the suction air passage.

Next, the mechanism in this embodiment that salinity does not adhere to the heating resistor 103 will be explained with reference to FIGS. 2A to 2D.

Figure 2A:
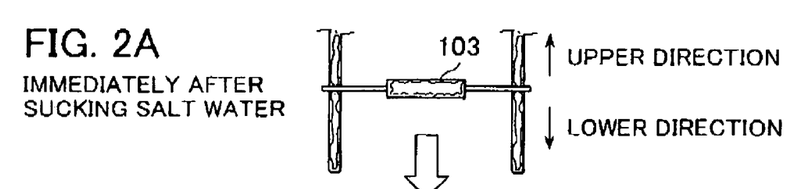
FIGS. 2A to 2D show diagrams for explaining the removal of salinity adhered to the heating resistor in the present invention.

Since salinity passes through the filter and disperses, the salinity flows into the suction air passage as fine particles. Thus, the salinity component is apt to crystallize, whereby salt adheres not only to the heating portion of the heating resistor 103 but also to the lead members 132a,132b and the supporting members 105a,105b.

Figure 2B:
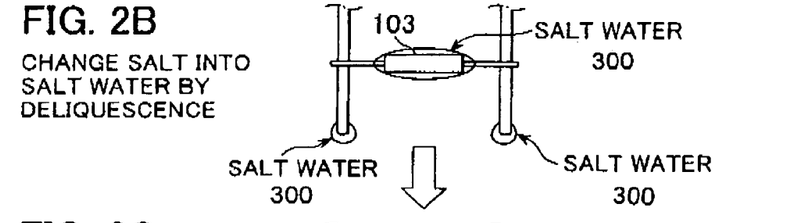

When a certain time period is passed after the current supply to the heating resistor 103 is stopped, the salt adhered thereto absorbs moisture in the air by deliquescence, and becomes salt water 300 near the heating resistor 103 and the support members etc. as shown in FIG. 2B.

Figure 2C:
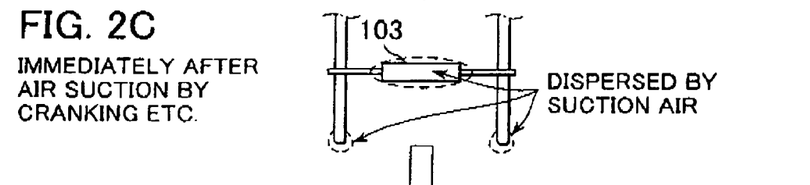
Figure 2D:
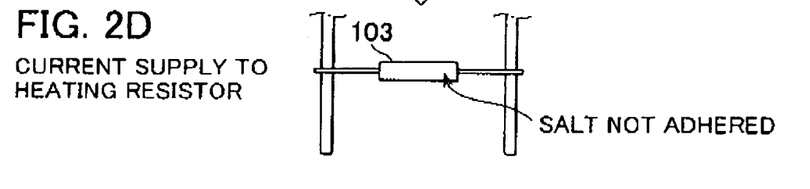

Then, suction air flows through the auxiliary air passage by the cranking of the engine to disperse the salt water 300 adhered not only to the support member parts but also to the heating resistor 103. Thus, even if the heating resistor is supplied with current after the dissipation, salt components do not remain on the heating resistor 103 (FIGS. 2C and 2D).

In order to compare with the embodiment of the present invention, the explanation will be made with reference to FIG. 3 as to the operation from the turning-on of the ignition key to the start of the engine in the generally used control apparatus for the engine having the heating resistor type air flow rate measuring apparatus.

Figure 3:
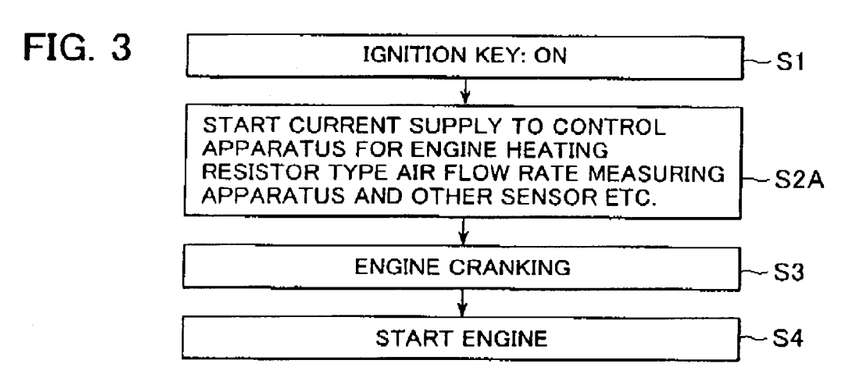
FIG. 3 is a flowchart of the control operation of a control apparatus for an internal combustion engine different from the present invention, which is a diagram for comparing with the present invention.

After the ignition key is turned on in step S1 of FIG. 3, the operation current is started to be supplied to the engine in step S2A, and also the current is supplied simultaneously to the sensor etc. and the heating resistor type air flow rate measuring apparatus.

After step S2A, the cranking of the engine is started to start the engine in step S3. Then, the engine is started at step S5.

Next, the mechanism in the operation shown in FIG. 3 that salinity solidifies and adheres to the heating resistor 103 will be explained with reference to FIGS. 4A to 4D.

The salt water is sucked into the suction air passage and adheres to the heating resistor 103 etc., and then salt is changed into salt water by deliquescence. This process is same as the case shown in FIGS. 2A and 2B(see FIGS. 4A and 4B).

Figure 4A:
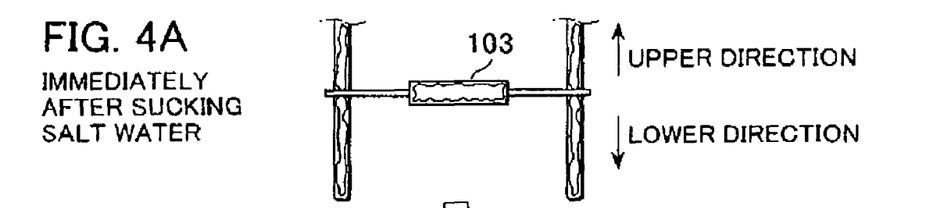
FIGS. 4A to 4D show diagrams for explaining the mechanism of the adhesion of salinity according to the operation of the example shown in FIG. 3.
Figure 4B:
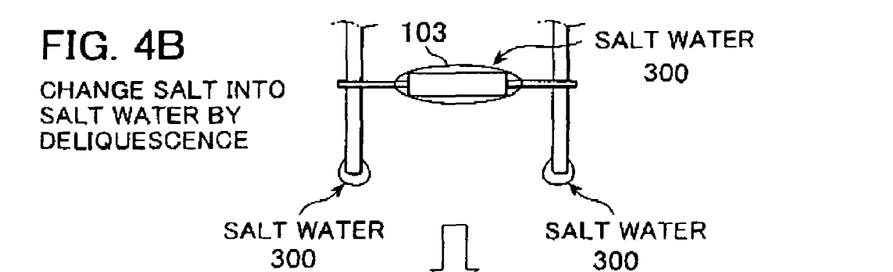
Figure 4C:
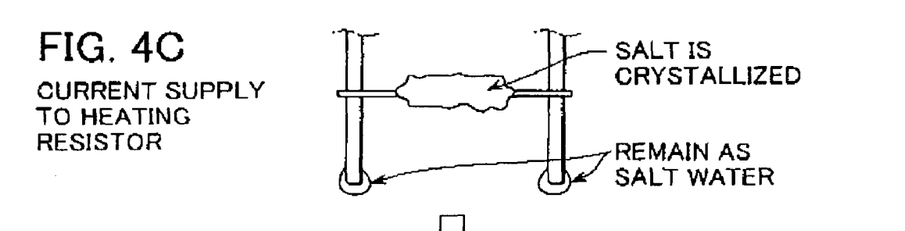

Thereafter, since current is started to be supplied to the engine and simultaneously to the heating resistor 103, the heating resistor 103 is heated before the air passes through the suction air passage. Thus, water of the salt water near the heating resistor is evaporated instantly, whereby only salt components remain and adhere to the heating resistor 103 (FIG. 4C).

Figure 4D:
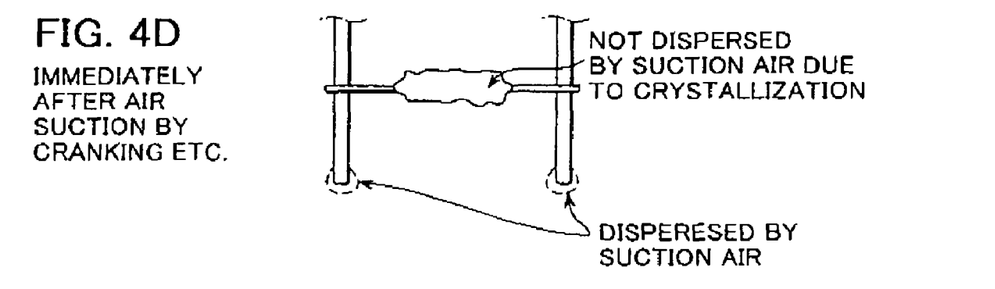

In this case, since the salt water 300 near the supporting members is not heated, this salt water keeps its state. Thereafter, when suction air flows through the suction air passage by the engine cranking, the salt water near the supporting members is dispersed and does not remain. However, only the salt components adhered to the heating resistor 103 remain as they are (FIG. 4D). Since this salt components are crystallized, the salt components are not dispersed from the heating resistor 103 by the suction air.

In contrast, the embodiment of the present invention shown in FIGS. 1 and 2A to 2D is configured in a manner that current is supplied to the heating resistor type air flow rate measuring apparatus upon the lapse of a predetermined time period, for example, almost one second after the starting of the engine cranking, then salt water adhered to the heating resistor 103 is removed by the air passing through the suction air passage and thereafter the heating resistor 103 is heated sufficiently.

Therefore, according to the embodiment of the present invention, it is possible to realize the control apparatus for an engine having the heating resistor type air flow rate measuring apparatus which can effectively remove salinity adhered to the heating resistor.

Accordingly, in the market, it is possible to provide a vehicle which can suppress for a long term to exhaust harmful exhaust gas.

The explanation is made as to the case where current is supplied to the heating resistor of the heating resistor type air flow rate measuring apparatus upon the lapse of the constant time period after the engine cranking. Alternatively, the present invention may be configured in a manner that even if current is supplied to the heating resistor simultaneously with the current supply to the engine, the heat start timing of the heating resistor is delayed so as to be after the engine cranking.

For example, current supplied to the heating resistor may be controlled in a manner that the current increases gradually after the start of the current supply to the control apparatus for an engine and reaches a prescribed current upon the lapse of a predetermined time period after the engine cranking thereby to suppress the heat generation of the heating resistor. In this case, the effects of the present invention can also be obtained.

Alternatively, current supplied to the heating resistor may be controlled in a manner that the current is intermittently supplied to the heating resistor for a constant time period after the start of the current supply to the control apparatus for an engine thereby to suppress the heat generation of the heating resistor until the predetermined time period lapses after the engine cranking. In this case, the effects of the present invention can also be obtained.

Further, the explanation is made as to the case where the control apparatus for an engine controls the current supply timing to the heating resistor of the air flow rate measuring apparatus. Alternatively, the heating resistor type air flow rate measuring apparatus may be provided with a delay circuit etc. for delaying the current supply to the heating resistor. In this case, the control apparatus for an engine simultaneously sends the current supply instruction to the engine and the current supply instruction to the air flow rate measuring apparatus.

In this manner, since the heating resistor type air flow rate measuring apparatus is configured to include the heat generation delay means such as the delay circuit for delaying the current supply to the heating resistor so that the current reaches the prescribed current (or prescribed temperature) upon lapse of the predetermined time period after the engine cranking, it is possible to realize the heating resistor type air flow rate measuring apparatus which can effectively remove salinity adhered to the heating resistor.

Further, in the present invention, since salinity adhered to the heating resistor is removed by the air flow in the state of salt water, it is possible to simultaneously remove dust etc. adhered to the heating resistor.

Accordingly, the present invention has the effects that it is not required to perform such a procedure of the conventional technique that the heating resistor is heated to about 1,000° C. after the engine stop to burn dust component etc. adhered to the heating resistor.

INDUSTRIAL APPLICABILITY

Although the explanation is made as to the case where the present invention is applied to the heating resistor type air flow rate measuring apparatus, the present invention is also applied to the flow rate measuring apparatus of other gas as well as air.

The invention claimed is:

1. A control apparatus for an internal combustion engine having a heating resistor type air flow rate measuring apparatus which flows a heating current through the heating resistor to heat the resistor and measures a flow rate of air sucked into the engine based on radiation of heat by sucked air, the control apparatus for an internal combustion engine comprising:

said air flow rate measuring apparatus supplying the heating current to the heating resistor upon lapse of a constant time period after start of rotation of the engine to delay heating of the heating resistor by the constant time period.

2. A control apparatus for an internal combustion engine according to claim 1, wherein the air flow rate measuring apparatus supplies the heating current to the heating resistor upon a lapse of one second as the constant time period.

3. A control apparatus for an internal combustion engine according to claim 1, wherein the air flow rate measuring apparatus supplies the heating current to the heating resistor after sucked air blows on the heating resistor.

4. A heating resistor type fluid flow rate measuring apparatus which flows a heating current through the heating resistor in accordance with an instruction signal applied outside to heat the resistor and measures a flow rate of fluid based on radiation of heat by sucked fluid, the heating resistor type fluid flow rate measuring apparatus comprising:

heat generation delay means which heats the heating resistor upon lapse of a constant time period after the instruction signal is supplied from the outside.

5. A heating resistor type fluid flow rate measuring apparatus according to claim 4, the heating resistor type fluid flow rate measuring apparatus further comprises the heat generation delay means supplying the heating current to the heating resistor upon lapse of the constant time period after the instruction signal is supplied from the outside thereby to delay heating of the heating resistor by the constant time period.

6. A heating resistor type fluid flow rate measuring apparatus according to claim 4, wherein the heat generation delay means heats the heating resistor upon lapse of one second as the constant time.

7. A heating resistor type fluid flow rate measuring apparatus according to claim 4, wherein the air flow rate measuring apparatus supplies the heating current to the heating resistor after sucked air blows on the heating resistor.

8. A control apparatus for an internal combustion engine having a heating resistor type air flow rate measuring apparatus which flows a heating current through the heating resistor to heat the resistor and measures a flow rate of air sucked into the engine based on radiation of heat to sucked air, the control apparatus for an internal combustion engine comprising:

said air flow rate measuring apparatus heats the heating resistor upon lapse of a constant time period after detecting a start of rotation of the engine.

9. A control apparatus for an internal combustion engine according to claim 8, wherein the heating current is supplied to the heating resistor upon lapse of the constant time period after detecting the start of rotation of the engine to delay heating of the heating resistor by the constant time period.

10. A control apparatus for an internal combustion engine according to claim 8, wherein the air flow rate measuring apparatus heats the heating resistor after sucked air blows on the heating resistor.

11. A control apparatus for an internal combustion engine according to claim 8, wherein the air flow rate measuring apparatus supplies the heating current to the heating resistor after sucked air blows on the heating resistor.

* * * * *